US012722843B2

(12) United States Patent
Davidson et al.

(10) Patent No.: US 12,722,843 B2
(45) Date of Patent: Sep. 1, 2026

(54) PERSONALIZED VALUE ITEM PACKAGING

(71) Applicant: E2INTERACTIVE, INC., Atlanta, GA (US)

(72) Inventors: Stephanie Davidson, Belton, MO (US); Nicole Weilert, St. Petersburg, FL (US)

(73) Assignee: E2INTERACTIVE, INC., Atlanta, GA (US)

(*) Notice: Subject to any disclaimer, the term of this patent is extended or adjusted under 35 U.S.C. 154(b) by 211 days.

(21) Appl. No.: 17/363,949

(22) Filed: Jun. 30, 2021

(65) Prior Publication Data

US 2023/0002110 A1 Jan. 5, 2023

(51) Int. Cl.

*B65D 5/62* (2006.01)
*B42D 15/02* (2006.01)
*B42D 15/04* (2006.01)
*B65D 73/00* (2006.01)

(52) U.S. Cl.

CPC ............ *B65D 5/62* (2013.01); *B42D 15/025* (2013.01); *B42D 15/045* (2013.01); *B65D 73/0085* (2013.01)

(58) Field of Classification Search

CPC .... B65D 5/62; B65D 73/0085; B65D 5/4212; B42D 15/045; B42D 15/025; A42D 15/045; A42D 15/025
USPC .............................................. 206/223, 459.5
See application file for complete search history.

(56) References Cited

U.S. PATENT DOCUMENTS 3,150,473 A 9/1964 Lemelson
3,519,128 A 7/1970 Swanberg
5,514,022 A 5/1996 Harris
5,722,538 A 3/1998 Neely
5,889,270 A 3/1999 Van Haagen
6,175,823 B1 1/2001 Van Dusen
7,055,740 B1 6/2006 Schultz
7,243,795 B2 * 7/2007 Gold ...................... B65D 25/34 40/310
8,712,835 B1 4/2014 Philyaw
8,896,613 B2 11/2014 Ronayne
D826,732 S 8/2018 Bruggink
11,111,065 B2 * 9/2021 Glass ..................... B65D 27/04
2002/0190115 A1 * 12/2002 Schuren ................... B65D 3/06 206/459.5
2006/0249948 A1 * 11/2006 Kenney ............. B42D 15/0093 283/36

(Continued)

*Primary Examiner* — Steven A. Reynolds

(74) *Attorney, Agent, or Firm* — Landmark IP Law; Gregory M Murphy

(57) ABSTRACT

The invention is generally directed to a package for a value item including a removable layer. In some embodiments, the invention includes a greeting card including a value item including a removable layer. In some embodiments, the invention includes a value item packaging system, including a package made from a substrate with colors or patterns printed thereon, and a removable layer disposed on top of, and at least partially obscuring, the colors or patterns, the package at least partially enclosing the item, and a stylus s configured to scrape or scratch away at least a portion of the removable layer thereby showing the colors or patterns printed beneath. Some embodiments may be a packaging system using a box and a lid made from a substrate at least partially covered by a liner, the liner having colors or patterns at least partially obscured by a removable layer; and a stylus.

5 Claims, 8 Drawing Sheets

(56) References Cited

U.S. PATENT DOCUMENTS

| | | | | |
|---|---|---|---|---|
| 2006/0278540 | A1* | 12/2006 | Schacht | A63F 3/065 206/39 |
| 2009/0172990 | A1* | 7/2009 | Corey | G09F 3/02 40/675 |
| 2009/0194449 | A1* | 8/2009 | Wu | B65D 23/14 206/459.5 |
| 2010/0325037 | A1 | 12/2010 | Halbur | |
| 2013/0001122 | A1 | 1/2013 | Nowzari | |
| 2013/0226728 | A1 | 8/2013 | Oghittu | |
| 2014/0058873 | A1 | 2/2014 | Sorensen | |
| 2014/0164159 | A1 | 6/2014 | Lovelace | |
| 2016/0244240 | A1* | 8/2016 | Brickwood | B42D 15/085 |
| 2017/0318929 | A1* | 11/2017 | Glass | B65D 27/00 |
| 2019/0031410 | A1* | 1/2019 | Vazquez | B65D 1/10 |
| 2020/0105164 | A1* | 4/2020 | Coelho | G09F 3/02 |

* cited by examiner

FIGURE 6A
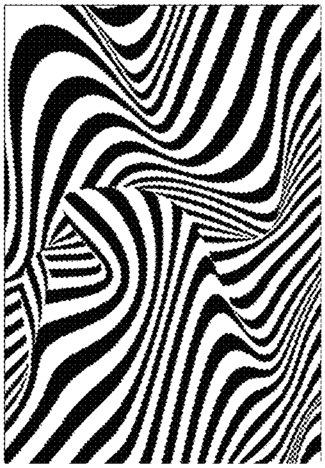
FIGURE 6B
FIGURE 6C
FIGURE 6D
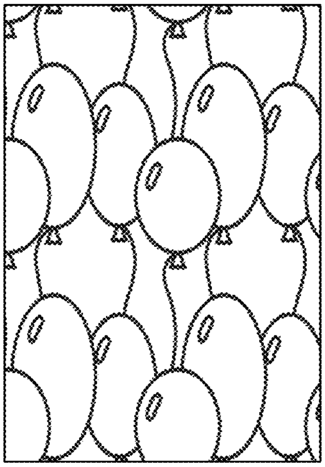
FIGURE 6E
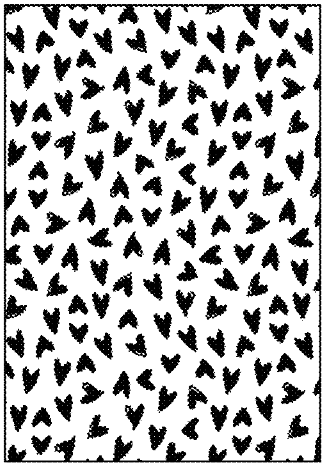
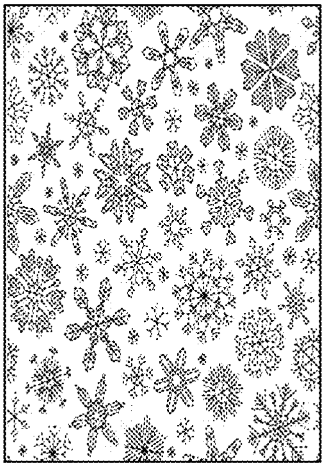
FIGURE 6F
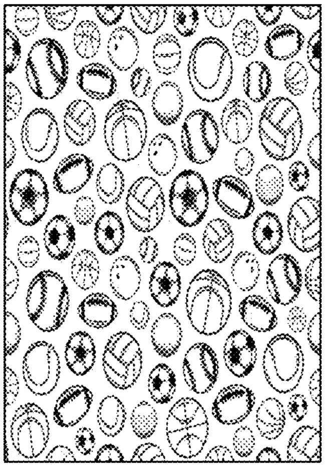
FIGURE 6G

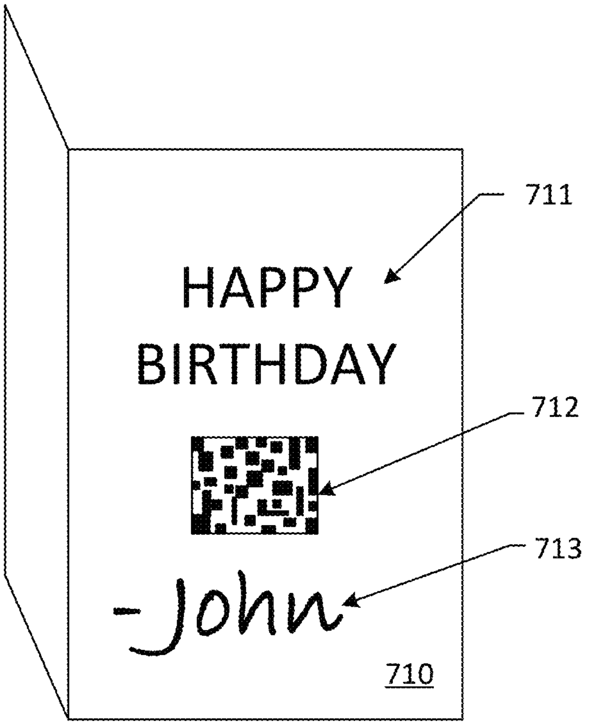
FIGURE 7
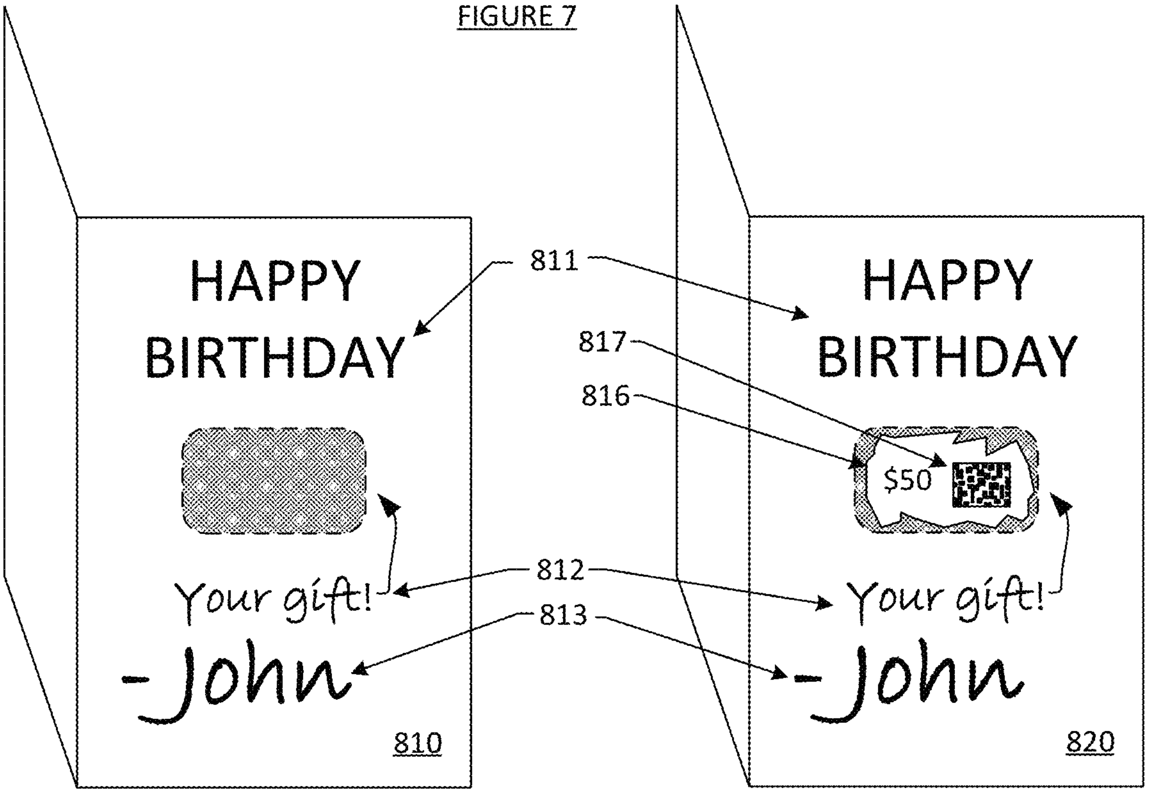
FIGURE 8A
FIGURE 8B

PERSONALIZED VALUE ITEM PACKAGING

FIELD OF THE INVENTION

The present invention is generally directed to customizable packaging that includes a removable layer. More specifically, the present invention is directed to packaging that may enclose or package a stored value card—digital or physical—with customizable panels or surfaces.

BACKGROUND

Giving gifts during holidays and certain events has been a part of culture and celebrations for generations. It is widely common to obscure the gift, for example by using wrapping paper, a gift bag, etc., to make the gift a surprise and/or increase excitement and intrigue around the gift giving process.

Transaction cards, stored value cards, or gift cards, as they are commonly called based upon their intended use, have become popular gifts. Gift cards typically comprise a stored value card associated with a certain cash equivalent value. Such value may be encoded upon a magnetic strip, bar code, or chip applied to the surface of the card, or may be associated with an account number or indicia present on the card. This stored value may be determined by the vendor prior to packaging and display for sale or, more commonly, is selected at the point of sale by the purchaser and loaded by the cashier by activating an account associated with the card or account number present on the card.

While popular, gift cards are typically provided with a generic and impersonal design, typically identifying an associated merchant for which the card may be used to purchase merchandise or even channel of redemption (such as Visa, Mastercard, American Express, etc.), and therefore are not personalized in view of the intended recipient. Various gift card packages have been introduced, but such packages are generally also generic and impersonal.

Accordingly, it is desirable to provide for packaging of transaction cards and stored value cards in a means that is both exciting and may be personalized by a giver. Such personalized packaging may also reduce the need for the additional purchase of a greeting card or tag, thereby potentially reducing costs and material consumption.

SUMMARY OF THE INVENTION

In accordance with some embodiments of the present invention, aspects may include a package for a value item, at least a portion of the package comprising a removable layer.

In accordance with some embodiments of the present invention, aspects may include a greeting card comprising a value item, wherein at least a portion of the greeting card comprises a removable layer.

In accordance with some embodiments of the present invention, aspects may include a value item packaging system, comprising: a package for a value item, the package comprising a substrate with colors or patterns printed thereon, and a removable layer disposed on top of, and at least partially obscuring, the colors or patterns, the package at least partially enclosing the item; and a stylus, the stylus configured to scrape or scratch away at least a portion of the removable layer thereby showing the colors or patterns printed beneath In accordance with some embodiments of the present invention, aspects may include a packaging system, comprising: a package comprising a box and a lid, the box and the lid comprised of a substrate; the substrate of the lid at least partially covered by a liner, the liner having: colors or patterns printed thereon; and a removable layer disposed on top of, and at least partially obscuring, the colors or patterns; and a stylus, the stylus configured to scrape or scratch away at least a portion of the removable layer thereby showing the colors or patterns printed beneath.

These and other aspects will become apparent from the following description of the invention taken in conjunction with the following drawings, although variations and modifications may be affected without departing from the spirit and scope of the novel concepts of the invention.

DESCRIPTION OF THE FIGURES

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIGS. 6A-6G illustrate exemplary patterns that be printed on a substrate beneath a removable coating, in accordance with some embodiments of the present invention.

FIG. 7 illustrates an exemplary greeting or birthday card, in accordance with some embodiments of the present invention.

FIGS. 8A-8B illustrate an exemplary greeting or birthday card, in accordance with some embodiments of the present invention.

Figure 1:
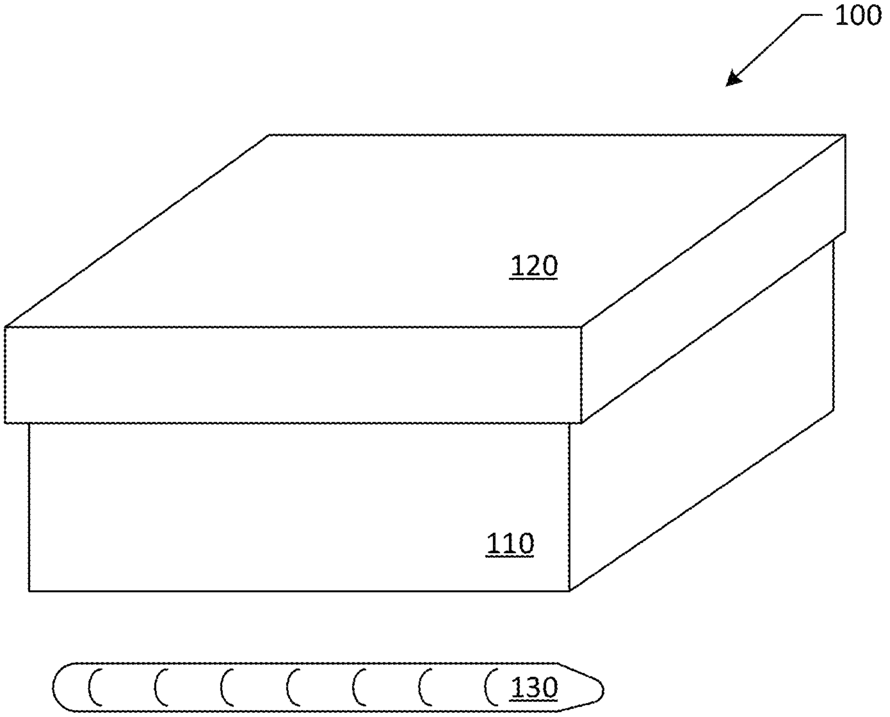
FIG. 1 illustrates an exemplary box and lid with at least a portion covered with a removable coating, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

The present invention is generally directed to customizable packaging that includes a removable layer. More specifically, the present invention is directed to packaging that may enclose or package a stored value card with a scratch-off removable layer for customization. Note that such packaging may be used for a physical gift card (where the gift card is present to conduct transactions) as well as digital gift cards, where the value may be digitally maintained either in an associated account, digital wallet, or otherwise stored. As discussed in greater detail below, the layer exposed by partial removal or scratching off of a coating may comprise various designs or patterns, including but not limited to designs or patterns directed to specific holidays or events.

With reference to FIG. 1, a system 100 will now be discussed. System 100 may comprise a package comprising a box 110 and a lid 120, as well as a stylus 130. Box 110 and lid 120 may be of any size or shape and is not bound to the specific configuration illustrated in FIG. 1. Stylus 130 may comprise plastic, wood, metal, and/or any other material that may be firm enough to remove an outer coating when the stylus is used to scratch.

A stylus may also take various forms, such as a pen, pencil, keychain, etc. It is also contemplated that rather than a stylus, a disc, button, or other item may be provided to scratch away the layer. Such items may be associated with the gift or may provide a side-gift for the user. For example, a gift corresponding to a graduation event may offer a scratcher that can be worn as a button labeled "Proud Parent." Or a scratcher for a holiday card may include a bottom or item labeled something along the lines of "Happy Holidays" or "Ho Ho Ho."

Box 110 and/or lid 120, or any portion thereof, may comprise a pattern or color, covered by a removable layer. For example, the lid 120 may comprise a bright green color, covered by a removable, differently colored titanium oxide layer that may be scratched away by a user. In this manner, a user may scratch away portions of the titanium oxide layer, thereby exposing in such areas the bright green color beneath. A user may therefore personalize the packaging for the recipient, user, event, and/or any other factor or characteristic.

Note that other materials may be used for the removable layer in addition to titanium oxide. For example, removable layers may comprise a removable metallic foil, opaque latex material, paints, inks, foils, overlays, and/or any other material that may be adhered to a substrate of the box 110 or lid 120 and removed using a scraping or scratching motion. Various layers of paint or adhesives may be used, as well as additional items such as but not limited to glitter, confetti, etc.

Figure 2:
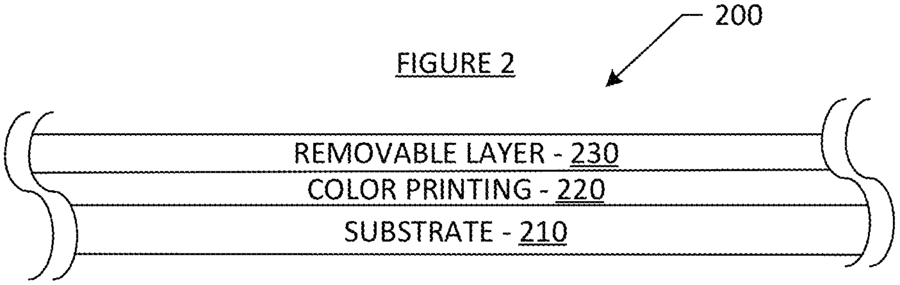
FIG. 2 illustrates an exemplary cross-sectional view of a substrate covered with a removable coating, in accordance with some embodiments of the present invention.

With reference to FIG. 2, an exemplary cross section 200 of a substrate with a removable coating is illustrated. Specifically, substrate 210 is shown having a pattern or color 220 printed thereon (shown on top of the substrate 210). The pattern or color 220 is then covered with a removable layer 230 (shown on top of the pattern or color 220). Accordingly, when the removable layer 230 is removed in whole or in part, such removal may expose the pattern or color 220.

Figure 3:
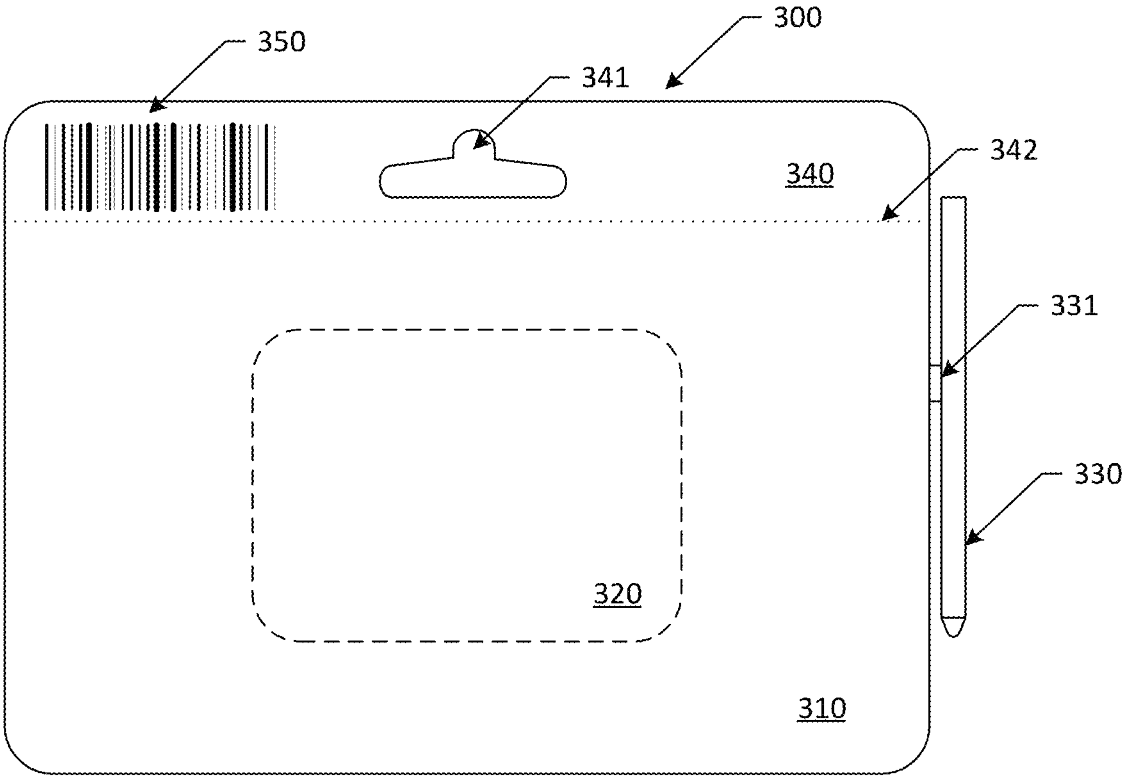
FIG. 3 illustrates an exemplary stored value card package, in accordance with some embodiments of the present invention.

Looking to FIG. 3, an exemplary package 300 is shown. Packaging 300 may be used to merchandise and/or sell a stored value card or other financial product, such as but not limited to a gift card, digitally redeemable gift card, general purpose financial card (which may or may not be reloadable), coupon, chit, and/or any other item of value. Package 300 may comprise a substrate 310, which item of value 320 may be attached to, adhered to, inserted within, encased by, or otherwise associated with the substrate 310. In addition, a stylus 330 may be provided to enable a user to remove some or all of the removable layer. Stylus 330 may be attached to package 300 using element 331. Element 331 may be any means sufficient to removably attach the stylus 330 to the package 300, such as tape, adhesive, putty, rubber band, low-tack glue, etc.

Package 300 may optionally comprise additional elements, such as but not limited to a removable section 340, which may comprise means for hanging or merchandising the package 300 (such as, but not limited to the sombrero hole 341), and information such as activation information shown at 350. Note that removable section 340 may be separated from the rest of the package by a line of weakness or scoring 342, which may permit a user to remove the pricing information from the packaging before offering the package 300 and item 320 to a recipient.

Note that the configuration and orientation of the package 300 shown in FIG. 3 is exemplary only. In other words, it is contemplated by the present invention that the stylus 330 may, for example, be attached to the removable portion 340, or may be packaged within the package itself (particularly if the item of value 310 comprises a removable coating for decorative purposes). In short, variations from the design and configuration illustrated are expected.

Figure 4A:
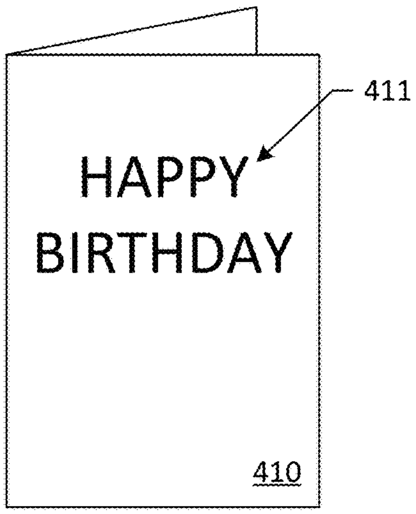
FIGS. 4A-4C illustrates an exemplary greeting or birthday card, in accordance with some embodiments of the present invention.
Figure 4B:
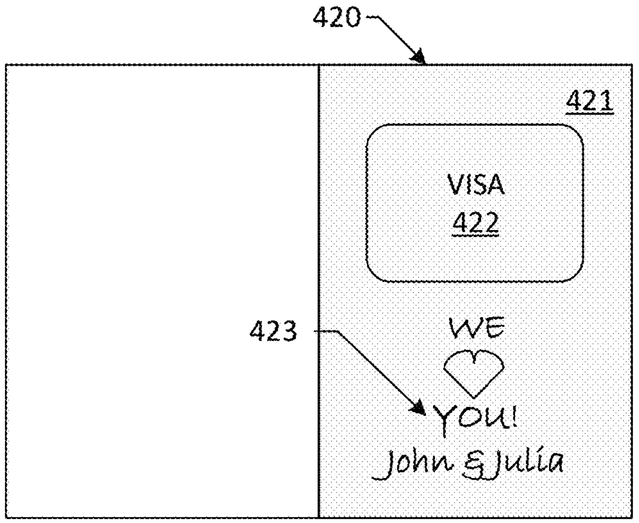
Figure 4C:
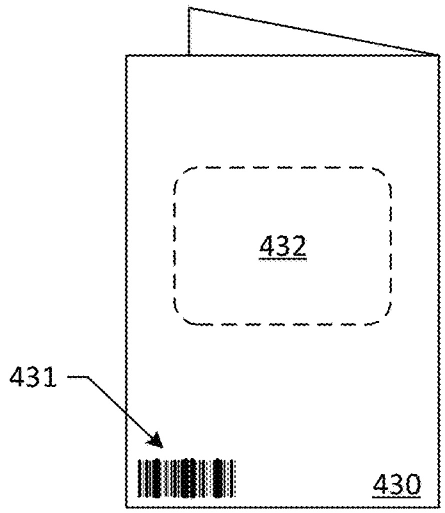

With reference to FIGS. 4A-4C, a greeting card or birthday card is shown. Greeting card or birthday card may comprise a front surface 410, an inside surface (typically printed on) 420, and a back surface 430, each shown in FIGS. 4A, 4B, and 4C, respectively. As with a typical greeting card or birthday card, the front surface 410 may comprise text or design 411. Text or design 411 may be, for example, a greeting, well-wishes, introduction to a joke or whimsical saying, image of balloons or holiday items, etc. The inside surface 420 may be printed with colors and/or a design and may be covered in whole or in part with a removable layer 421. A user may scratch away removable layer 421 to personalize the card with messages, drawings, etc., shown at 423. In this manner, a generalized greeting card may be personalized using system, methods, and/or processes in accordance with some embodiments of the present invention.

Note that the card may also include a value item 422. Value item 422 may be a stored value card or other such physical item or may be an identifier that may be redeemed for digital value. In accordance with some embodiments, value item may be a code (such as but not limited to a bar code (traditional, QR code, etc.), an alpha, numeric, or alphanumeric code) that may be used to redeem a value or a digital item.

With reference to FIG. 4C, the back portion 430 of the card may comprise additional information, for example information 431 used to purchase the card and/or activate the value item. In accordance with some embodiments, for security purpose the value item 422 may be packaged within or sealed within the substrate of the card and the back portion 430 may include lines of weakness or scoring that may be used to remove the value item 422 from the card.

Note that in the discussion above the removable layer was only discussed on the inner portion 420. However, it is contemplated that any portion—or the entirety—of the card may be covered with printed colors or designs, overlayed with a removable layer. In this manner, any portion of the card may be personalized by a user.

Figure 5A:
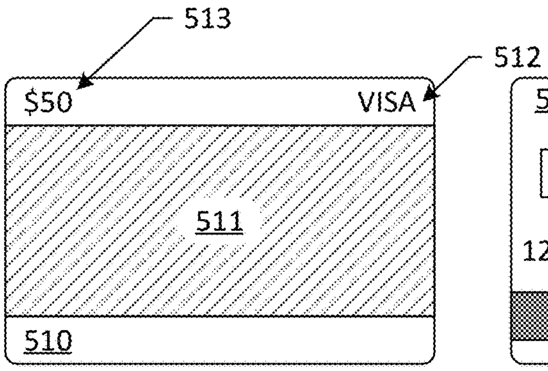
FIGS. 5A-5B illustrate an exemplary stored value card, in accordance with some embodiments of the present invention.
Figure 5B:
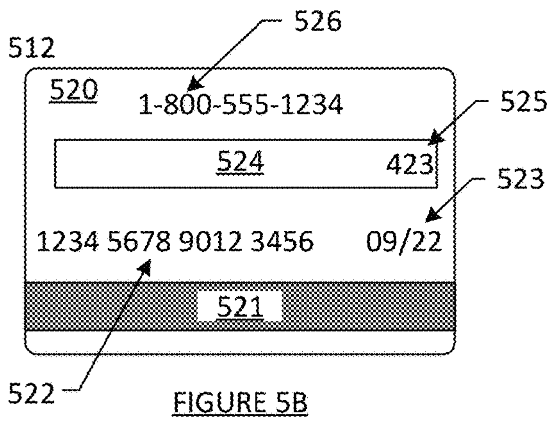

With reference to FIGS. 5A-5B, a value item 500 will now be discussed. Value item 500 may comprise a stored value card, gift card, toll-card, long-distance card, wireless top-up card, gift certificate, chit, credit card, prepaid credit card, general purpose financial services product, reloadable financial services product, coupon, and/or any item redeemable for something of value. FIG. 5A illustrates a front surface 510 of a value item, which may comprise some identifying features (such as redemption network 512 ("VISA") and/or amount 513 ("$50"). Note that it is contemplated that these items are optional are not required by all embodiments of the present invention.

Front surface 510 of the value item 500 may also comprise an area coated with a removable layer 511. In this manner, a user may scratch away portions of the removable layer 511 to personalize the value item 500. As discussed above, under the removable layer 511 various colors, patterns, designs, images, etc. may be printed in one or more colors.

With reference to FIG. 5B, a back surface 520 of the value item 500 may comprise information required to use or otherwise redeem the value item 500. For example, back surface 520 may comprise an indicia 521 (which may be a machine readable indicia, such as a magnetic stripe or bar code), serial or personal account number 522 associated with the value item, expiration date 523, area for a signature or identifying information 524, and potentially a card verification value (CVV) or card verification code (CVC) 525. Additional information, such as a contact number 526 may also be printed on the value item. However, again note that the additional information shown on the back surface 520 of value item 500 is exemplary, and it is contemplated that in accordance with some embodiments of the present invention, various products may include all, some, or none of this information.

As discussed above, beneath a removable layer a substrate may be printed with various colors, patterns, designs, etc. Some or all of such colors, patterns, designs, etc. may be revealed when a user removes some or all of the removable layer. It is contemplated that colors, designs, patterns, etc. may be event-agnostic (that is, merely colored or using various patterns), or may be specifically directed to certain events. For example, with reference to FIGS. 6A-6G, various patterns can be seen. FIGS. 6A-6C illustrate event-agnostic patterns, while FIGS. 6D-6F are directed to specific events. FIG. 6D shows balloons, often associated with birthdays, graduations, and other celebratory events. FIG. 6E shows hearts, often associated with Valentine's day, dating, anniversaries, etc. FIG. 6F illustrates snowflakes, often associated with winter holidays such as Christmas, Hannukah, Kwanza, etc.

It is also contemplated that patterns may be more specific, but not directed to a specific event. For example, FIG. 6G shows a pattern of sports-balls and/or equipment which may be used for various events (birthdays, Father's Day, Christmas, random gifts, etc.).

FIG. 7 illustrates a greeting or birthday card 700 in accordance with some embodiments of the present invention. Card 700 includes an inner surface 710 which may comprise a message 711 printed on the card 700. However, portions or the entirety of the surface 710 may be coated with a removable layer, as discussed above. In this manner, a user may personalize the card 700 by writing personal messages or greetings, drawing various items, etc., such as shown at 713.

Card 700 may also comprise an indicia 712 that may be used by a recipient to access and/or redeem something. For example, indicia 712 may redeem a digital value item, or may provide access to an online video personalized by the user. It is contemplated that indicia 712 may be visible, or itself be covered by the removable layer. Covering the indicia by the removable layer (particularly if the indicia is redeemable for a value item) may increase the security of the item and potentially reduce fraud based on bad actors having access to the redeemable code.

It is contemplated that indicia 712 may be activated or authorized by transactions—for example, through a purchase transaction in the case of a value item, or by associated a file with the indicia in the case of a personalized video. Such activation or authorization may be associated with an additional indicia or indicium (such as discussed above with regard to FIG. 6) or through other means (for example, explained in packaging, sales material, etc.).

Turning to FIGS. 8A and 8B, removable layers may be used to both provide personalization from users as well as provide additional fun or excitement to recipients. FIGS. 8A and 8B show a message or salutation at 811 ("Happy Birthday!"). FIG. 8A shows an inside surface of a greeting card or birthday card when a portion of the removable layer has been removed. More specifically, FIG. 8A shows that a user has scratched away a portion of the removable layer at 813 to write a name "John" and draw a smiley face. However, FIG. 8A shows a notation 812 that a gift for the recipient can be found under a portion of the removable layer 814, surrounded by an indicator line 815.

At FIG. 8B, this portion 814 of the removable layer has been removed, showing for example a value of the gift at 816 ("$50"), and a code or other redemption information 817. In this manner, even upon opening a personalized card, a recipient is still unaware of the gift, potentially building the excitement.

Figure 9:
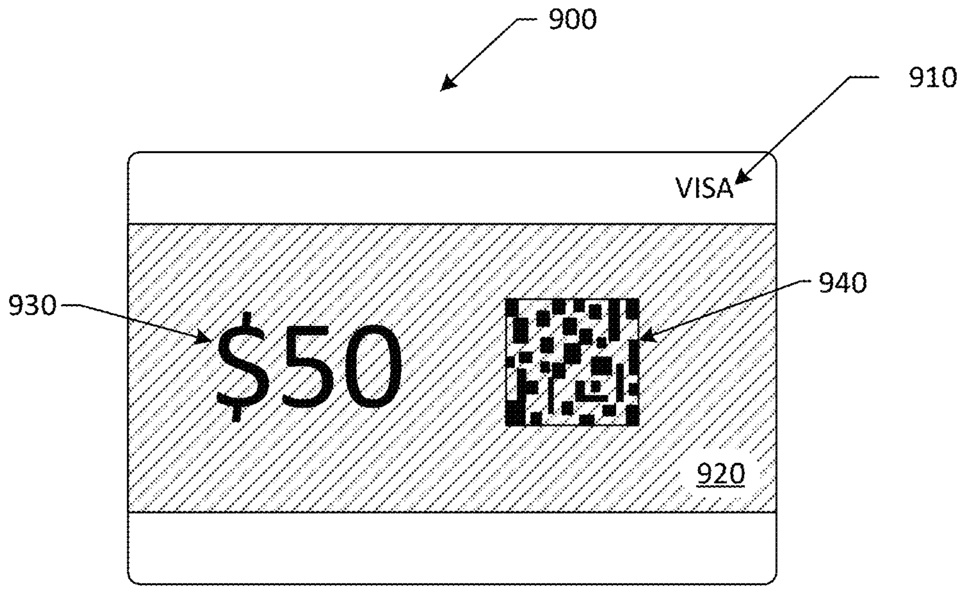
FIG. 9 illustrates an exemplary stored value card or indicia for redeeming a digital stored value, in accordance with some embodiments of the present invention.

At FIG. 9, such excitement can also be found by using the scratch-off layer to obscure or cover details of a value item or chit 900. More specifically, value item 900 may comprise an identifier 910 of a redemption network, but the value 930 and/or indicia or instructions to access the value 940 may be covered by a removable layer 920. Such removable layer 920 may be removed in whole or in part by a user for personalization of the gift, and may be provided to the recipient with portions of the removable layer 920 intact, for example continuing to obscure the gift amount 930 and indicia 940.

In accordance with some embodiments of the invention and as discussed above, the indicia may be a machine-readable indicia (bar code, QR code, magnetic stripe, radiofrequency identification (RFID) tag, etc.), or may comprise a alpha, numeric, and/or alphanumeric code that may be entered or otherwise provided subsequently to access or obtain the value.

While various packaging shapes and sizes are contemplated by the present invention, specific examples are set forth in FIGS. 10A-10E and FIGS. 11A-11D. FIGS. 10A-10E and 11A-11D illustrate a box approximately four (4) inches wide by four (4) inches high, and approximately 0.875 inches deep. Note that these sizes and values are variable, and this detailed description of size is included as exemplary only and shall not be construed to be limiting. In general, the box may be made so that a bottom and a top fit together, with the top overlapping the bottom edges, as is typical with two-part boxes. The box and top may be constructed of any material, for example cardboard, pressboard, one-millimeter grey board, etc. The box and top may be lined with laminated paper, such as 0.0075" coated one-side (C1S) matte paper. The top of the box may be printed with various shapes and colors, for example using four-color printing to achieve vibrant colors. Additional details regarding the box and lid are discussed below with regard to FIGS. 10A-10E and 11A-11D.

Figures 10A, 10B, 10C, 10D, 10E:
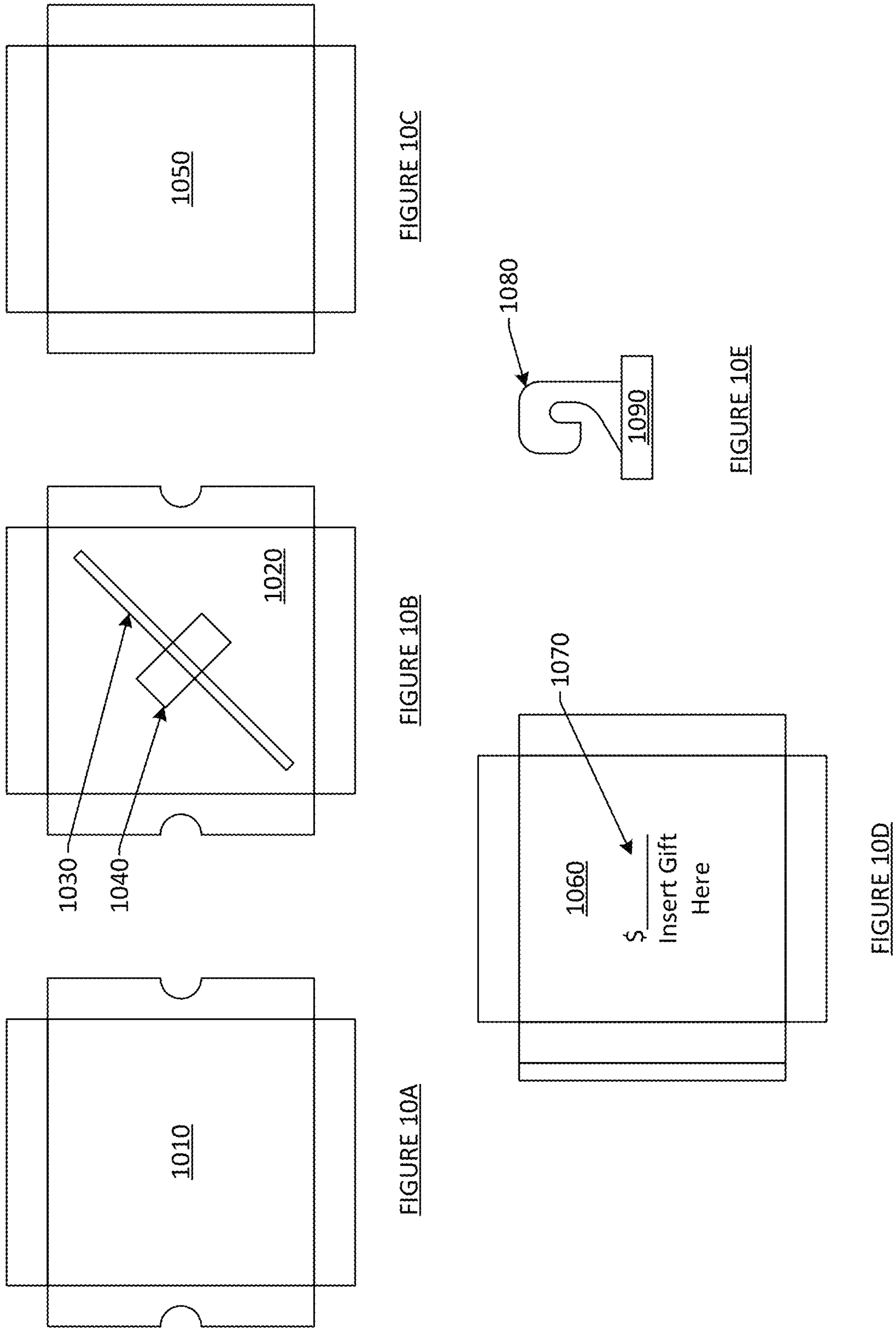
FIGS. 10A-10E illustrate exemplary patterns to use in cutting out packaging, in accordance with some embodiments of the present invention.

A top view of a box top 1010 is shown in FIG. 10A. FIG. 10B shows the reverse of the top 1020 and illustrates that a stylus or other type of scraping device 1030 may be attached to the reverse of the top 1020, for example using tape 1040. FIG. 10C illustrates a bottom 1050, together with top may be used to form a box in accordance with some embodiments of the present invention. In some embodiments, additional elements may be included, for example a tray 1060 as shown in FIG. 10D, which may be used to hold a value item and may include an area 1070 for a user to write or inscribe a value of the product. For merchandising purposes, a j-hook 1080, shown in FIG. 10E, may be attached to the box top or bottom, for example by using an adhesive area 1090. It is contemplated that such packaging may be sold assembled or unassembled in a flat condition. As discussed in greater detail below with regard to FIG. 11, one or more portions or surfaces of the box or top may be coated with a removable layer as discussed throughout this invention.

Figure 11A:
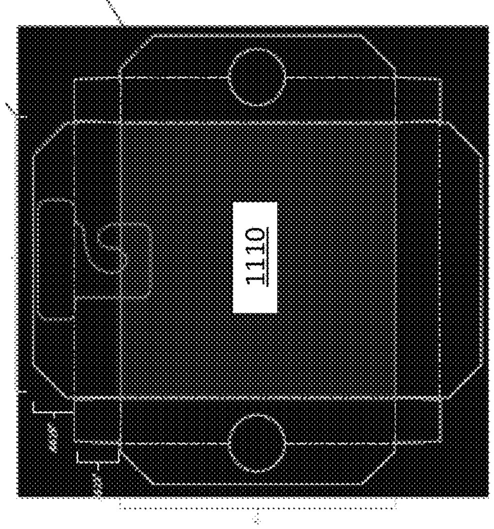
FIGS. 11A-11D illustrate exemplary packaging, in accordance with some embodiments of the present invention.
Figure 11B:
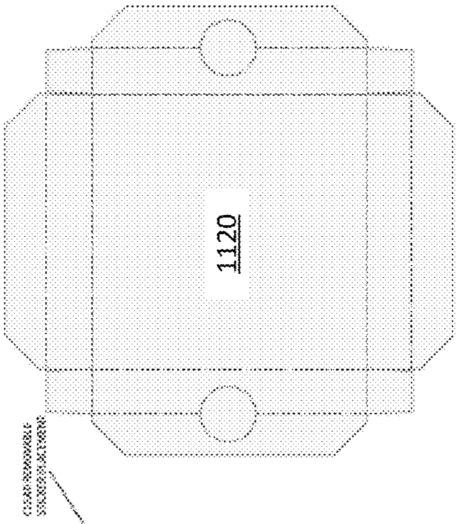
Figure 11C:
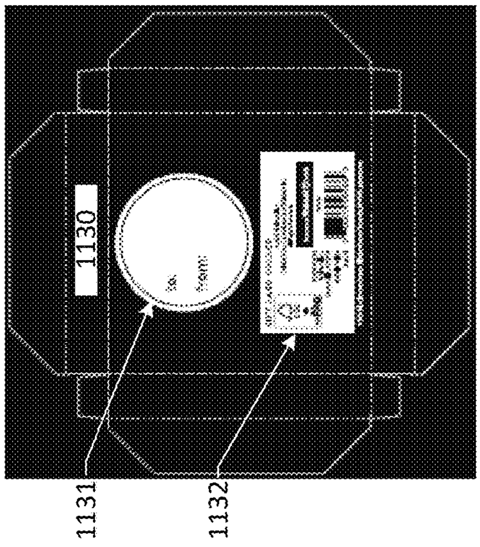
Figure 11D:
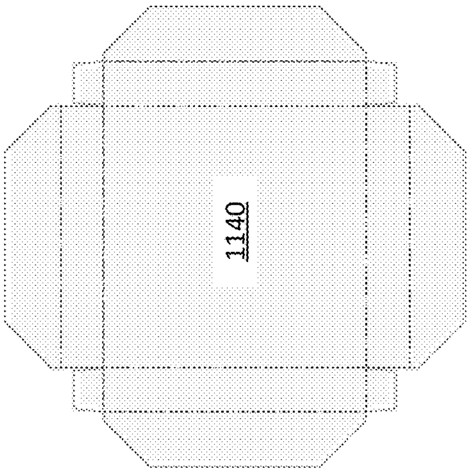

FIGS. 11A-11D show a liner for a top surface of a box top 1110 in FIG. 11A, a reverse side of the liner 1120 in FIG. 11B, a first surface of a bottom liner 1130 in FIG. 11C, and a reverse side of the bottom liner 1140 in FIG. 11D. It can be seen that one side of the liners (1110, 1130) may include a removable layer that may be personalized by a user. The bottom liner may also comprise additional information, such as user/recipient information at 1131 and/or information about the product 1132, such as but not limited to a product number, universal price code (UPC) or stock-keeping unit (SKU), identification of manufacturer, etc. Note that other than the user/recipient information at 1131 and the information about the product 1132, the rest of the liner may be coated with a removable layer that may be partially removed by a user to personalize the gift box.

Note that in accordance with some embodiments of the present invention, the scratch-off layer may be protected or shielded by a peel-off layer or sticker to prevent unwanted scratches or marks on the scratch-off layer. Such stickers may be adhered to the scratch-off layer via adhesive or static attraction. In some embodiments, an insert such as a cardboard panel may be used to protect the scratch-off layer until purchase and personalization. The ability to protect the scratch-off coating may also determine what surfaces of a gift component are coated with the scratch-off material. For example, sides of a gift box may be difficult to protect, and accordingly may not be coated with the scratch-off material.

It is also contemplated by the present invention that the scratch off layer may be of any color or opacity. Designs, patterns, pictures etc. may be printed on top of the scratch off layer, as well as beneath the scratch-off layer. Such scratch off material may be utilized in any sort of gift card holder, including three-dimensional holders (boxes, jars, components, etc.).

Personalization of gift card holders and other devices (such as cards that indicate or provide information sufficient to obtain and/or redeem a digital value or digital gift card) may occur in additional manners. For example, in some embodiments rather than physically scratching off and irreversible altering an item or packaging, personalization may be removable, erasable, or otherwise modifiable.

For example, through the use of resistive screens or panels, various personalization may occur. Resistive screens may comprise “magic screen” or “magic slate” material, where a flap of material is pressed against a backing using a finger or stylus, and a mark is made where the material is pressed against the backing. Such drawings or marks may be removed or erased by lifting the flap of material away from the backing, removing the marks for subsequent drawing or marking.

In a simple embodiment, a transparent sheet (for example a sheet of acetate) may loosely rest atop a substrate. The substrate may be, for example, a wax or wax-like material. When the transparent sheet is pressed against the substrate, the color of the substrate may show through. Any markings or drawings may be erased by lifting the sheet away from the substrate.

In some embodiments of the invention, the transparent sheet may comprise polyethylene terephthalate (PET) or any material with similar characteristics or properties, and the substrate may comprise a wax-coated board, cardboard, paper, or substrate.

Some resistive screens may comprise at least in part a liquid crystal display (LCD) and utilize a power source such as a battery. Such devices may have layers of electrodes with liquid crystals disposed between. Such liquid crystals may generally be transparent, but if pressed—for example by a finger or a stylus—the liquid crystals may be aligned, thereby becoming reflective and indicating the marks. The battery may be utilized to provide a small amount of power to return the liquid crystals to their original, transparent, orientation.

Other mechanisms for personalization may comprise magnetophoretic panels, which may utilize a liquid comprising dark magnetic particles that may be drawn to the panel surface using a magnetic stylus or device.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A package for a value item, comprising:

a box, comprising a bottom surface and four walls attached substantially perpendicular to the bottom surface;

a box lid, comprising a substantially planar surface and four lips attached substantially perpendicular to the top surface;

wherein the box further comprises a box liner, the box liner coated with a removable layer over at least one surface thereof, the box liner comprising a writeable portion to indicate who the gift is to or from, and comprising information regarding the value item, the writeable portion and the information not being covered by the removable layer;

wherein the box lid further comprises an exterior surface and an interior surface, at least a portion of the exterior surface of the box lid being covered by the removable layer, wherein colors or patterns are printed beneath the removable layer which obscures the colors or patterns.

2. The package of claim 1, wherein the colors or patterns comprise patterns associated with holidays or events.

3. The package of claim 1, wherein the package is comprised of cardboard or grey board.

4. The package of claim 1, further comprising a stylus, wherein the stylus is configured to scrape or scratch away at least a portion of the removable layer thereby showing the colors or patterns printed beneath.

5. The package of claim 4, wherein the stylus is comprised of wood or plastic.

* * * * *